United States Patent [19]

Klees

[11] Patent Number: 5,060,284
[45] Date of Patent: Oct. 22, 1991

[54] ADAPTIVE ERROR DIFFUSION THRESHOLDING FOR DOCUMENT IMAGES

[75] Inventor: Kevin J. Klees, Rochester, N.Y.

[73] Assignee: Eastman Kodak Company, Rochester, N.Y.

[21] Appl. No.: 498,119

[22] Filed: Mar. 23, 1990

[51] Int. Cl.⁵ .............................................. G06K 9/00
[52] U.S. Cl. ..................................... 382/53; 358/465; 382/50
[58] Field of Search .................... 382/53, 50; 358/405, 358/40ϟ, 445, 455, 463, 466

[56] References Cited

U.S. PATENT DOCUMENTS

| | | | |
|---|---|---|---|
| 3,394,346 | 7/1968 | Bailey | 340/146.3 |
| 3,737,855 | 7/1973 | Cataia | 340/146.3 AG |
| 4,124,870 | 9/1978 | Schatz et al. | 358/260 |
| 4,231,065 | 10/1980 | Fitch et al. | 358/166 |
| 4,442,544 | 4/1984 | Moreland et al. | 382/53 |
| 4,446,486 | 5/1984 | Itoh | 382/53 |
| 4,468,704 | 8/1984 | Stoffel et al. | 382/53 |
| 4,504,864 | 3/1985 | Anastassion et al. | 358/167 |
| 4,510,618 | 4/1985 | Ataman et al. | 382/54 |
| 4,517,607 | 5/1985 | Ohkouchi et al. | 382/54 |
| 4,532,651 | 7/1985 | Pennebaker, Jr. et al. | 382/54 |
| 4,554,593 | 11/1985 | Fox et al. | 382/50 |
| 4,573,070 | 2/1986 | Cooper | 358/36 |
| 4,575,768 | 3/1986 | Sakai et al. | 358/466 |
| 4,593,325 | 6/1986 | Kannapell et al. | 382/50 |
| 4,633,327 | 12/1986 | Roetling | 382/53 |
| 4,637,059 | 1/1987 | Habitzreiter et al. | 382/54 |
| 4,731,863 | 3/1988 | Sezan et al. | 358/455 |
| 4,924,322 | 5/1990 | Kurosawa et al. | 358/457 |

Primary Examiner—Leo H. Boudreau
Assistant Examiner—Barry Stellrecht
Attorney, Agent, or Firm—Dennis R. Arndt

[57] ABSTRACT

Apparatus for converting multilevel video images into a bilevel image having an accurate rendition of the original grayscale of the image. The apparatus can provide an improved rendition of low contrast images.

12 Claims, 6 Drawing Sheets

ADAPTIVE ERROR DIFFUSION THRESHOLDING FOR DOCUMENT IMAGES

TECHNICAL FIELD

The present invention relates to a method of processing video images to reproduce them in black or white picture elements. An error diffusion type algorithm is used which preserves edge detail while converting multilevel video images into bilevel images which present an accurate rendition of the original grayscale.

BACKGROUND ART

Many electronic systems to manipulate images in digital form use techniques to convert images with multiple gray levels into images with only two gray levels (bilevel). A simple method to accomplish this conversion is to compare the multi-level input against a fixed threshold value. If the input is greater than the threshold, the output is set to the maximum output level. In the other case, the output is set to the minimum level. In this simple algorithm, the difference between the input level and the output level is ignored.

A more advanced technique known as error diffusion makes use of this ignored difference to create a more accurate bilevel rendition of the input gray levels. This is accomplished by spatially modulating pixels in the output image. The percentage of pixels set to maximum levels in an area of the output image will represent the gray level of the input image. This technique trades off the spatial resolution of the output system for the gray level resolution of the input system. One of the original papers discussing error diffusion by Robert Floyd and Louis Steinberg, entitled "4.3: An Adaptive Algorithm for Spatial Grey Scale", Stanford University, Stanford, Calif.; SID 75 Digest, pp. 36-37, describes the use of this algorithm.

An input pixel with gray levels is compared against a threshold, and set to either full brightness, or no brightness (on/off). After this decision, an error is calculated between the new level of the pixel and the original level of the pixel. This error is then "diffused" to surrounding pixels before they are compared with a predetermined threshold. The error is diffused to, and summed with an unprocessed pixel, and the pixel is later thresholded, generating yet another error. Thus, any one pixel in the image may be affected by errors from many previous pixels before being processed.

Using current error diffusion techniques, this error is calculated by a simple linear subtraction of the two levels of the pixel.

Typically a percentage of the error signal is diffused to each of 4 pixels that have not been thresholded yet. These might be a pixel adjacent to the pixel being thresholded, and three pixels on the next line of the image. A set of percentages for the error distribution could be referred to as an "error kernel", and typically would add up to 100%. An example of such a set would be:

```
    ⋮
...X X X X X X X X X X X X X    A = 5/16
   X X X X X X X X X X X X X    B = 1/16
   X X X X X P A 0 0 0 0 0 0    C = 7/16
   0 0 0 0 D C B 0 0 0 0 0 0    D = 3/16
   0 0 0 0 0 0 0 0 0 0 0 0 0...
    ⋮
``` where P is the pixel being processed, and the ratios define the percentage of error diffused to each of the surrounding pixels. Note that pixels on previous lines receive no portion of the error since they have already been converted to bilevel pixels. At each of the locations receiving the error, it is summed with the pixel, and a range check operation is performed to keep the data in range.

U.S. Pat. No. 4,449,150 in the name of KATO, is directed to a modification of the error diffusion technique. This modification is intended to remove an artifact that is associated with the algorithm. Certain values of inputs will produce noticeable artifacts in the form of patterns and streaks in the output image. KATO solved this by randomizing the threshold used in the original algorithm.

DISCLOSURE OF THE INVENTION

In accordance with the present invention, the error signal is calculated as the difference between the local minimum or maximum of the image and the original pixel level. This results in a better rendition of low contrast images. These local minimum and maximum values are calculated using a peak and valley tracking technique, which will be discussed further. In the original technique the error signal is calculated as a simple subtraction of the pixel values before and after thresholding. In this invention the error is generated as a subtraction of the local image minimum or maximum and the pixel value after thresholding. The polarity of the pixel value after thresholding is used to determine if the local minimum or maximum is used.

An electronic imaging system with 8 digital bits allocated to represent the gray level of a pixel would allow a range of 0-255 as valid pixel values. The local maximum would be defined as the average of those image pixels taken over a large area that are closest to 255. Likewise the minimum is defined for pixels closest to 0.

If an input pixel value of 200 is compared to a threshold of 127, the result is an output of 255. In the prior art this would produce an error of minus fifty five ($-55$). If the local maximum of the image at this point was 210, an error signal of minus 10 ($-10$) would result. In this example the fact that the output pixel value was 255 selected the use of the local maximum for the error calculation. In a case where the output from the thresholding operation is zero, the local minimum would be used.

One possible way to generate the local maximum is to compare the incoming pixel value to an existing maximum, and replace the existing maximum with the larger of the two. For example if the current local maximum is 200 and the incoming pixel is 210, the maximum would be exchanged to 210. The pixel value used for this comparison should not have had any errors diffused to it. With this technique it is necessary to also reduce the local maximum by some percentage before each pixel to prevent it from quickly reaching 255 and not changing. Before this comparison and possible exchange the current maximum could be reduced by perhaps 2 counts. (or, $200-2=198$ in this example).

The local minimum can be generated in a similar fashion, except that the smaller of the two compared values becomes the new minimum. Also the minimum is increased by several counts to prevent it from reaching zero and remaining there.

MODES OF CARRYING OUT THE INVENTION

Figure 1:
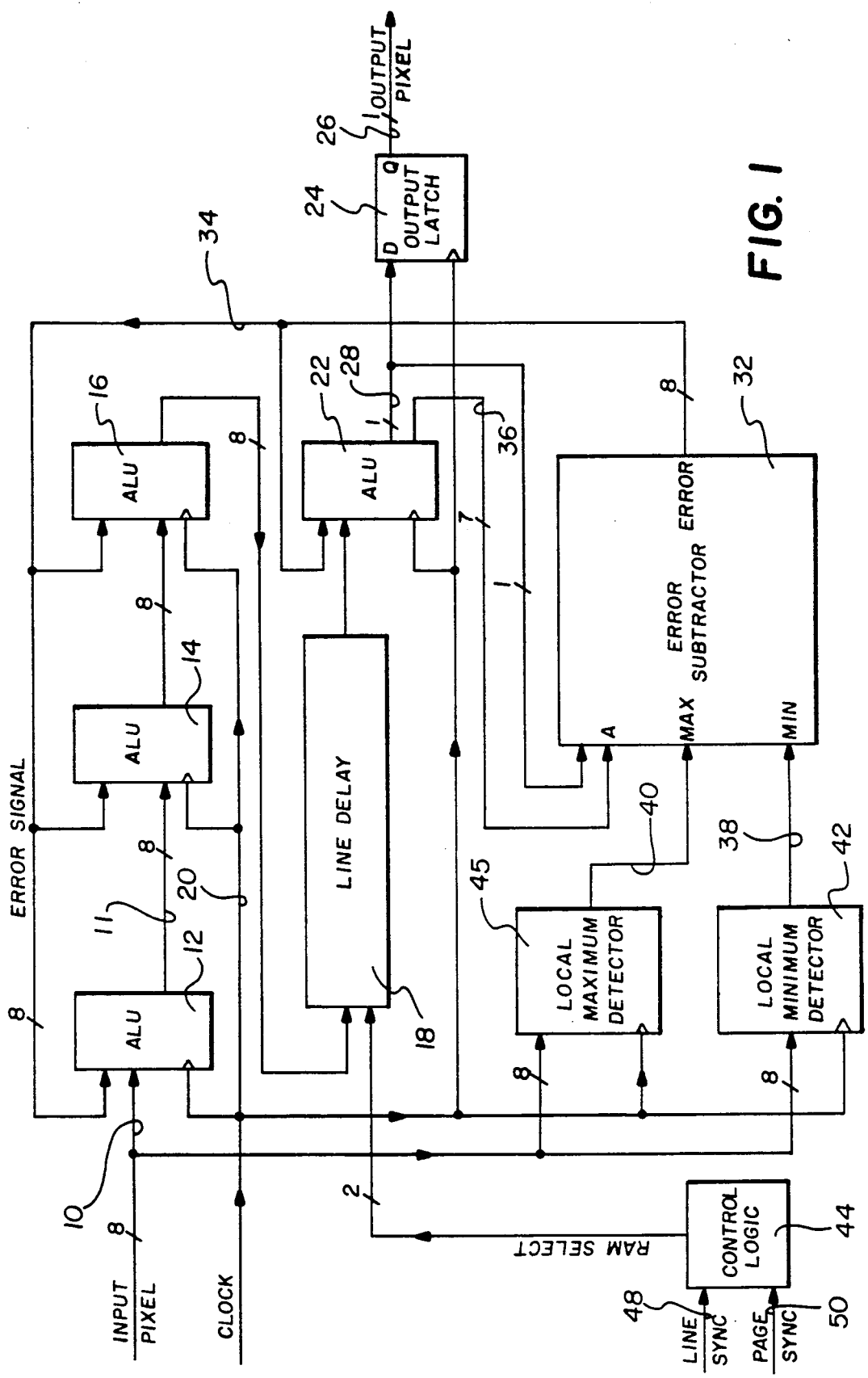
FIG. 1 shows a block diagram for the apparatus according to the present invention.

The invention will be described with reference to the accompanying drawings. FIG. 1 is a block diagram of a circuit that performs edge enhanced error diffusion processing on a digital video image. Image pixels are input on line 10 to three arithmetic logic units (ALU) 12, 14, and 16. The ALU's take each pixel that is serially input and either adds or subtracts an error signal that is fed back from pixels that are further downstream and are currently being processed. The particular pixel that generates the error signals has already passed through the ALU's as well as a line delay 18 (to be discussed later).

Incoming pixels are latched into ALU 12, the first ALU along with the current error data. This error data is then either added or subtracted (depending on the sign of the error data). The result of this calculation is also checked internally within the ALU to be sure that the result is within the appropriate range. This data is then latched into ALU 14 on the leading edge of the next clock signal on line 20, and the new error data is added. After three ALU's 12, 14 and 16 have operated on the input pixel data, it is then delayed by one vertical line thru the use of a line delay 18. Line delay 18 functions to delay each pixel by the length of the line minus three pixels.

The output of line delay 18 is then passed to a fourth ALU 22 and has a further error signal either added or subtracted with it. The most significant bit of the pixel output by ALU 22 is then sent to output latch 24, and error subtractor 32 via line 28. The remaining lower 7 bits of the pixel output by ALU 22 are passed to the error subtractor 32 via line 36.

Local minimum detector circuit 42 generates a result using the input pixel on line 10, latches it, and passes this result to 2:1 error subtractor 32 via line 38. Local maximum detector circuit 45 generates a result using the input pixel on line 10, latches it, and passes this result to error subtractor 32 via line 40.

Control logic 44 generates select signals for line delay 18. These signals are generated from line sync and page sync signals on lines 48 and 50 respectively.

All four of the ALU's in FIG. 1 are identical and are merely replicated in four places. There are basically three inputs to the ALU and those are the clock signal, the error data, and the pixel data, For example, ALU 14 has as its inputs the error signal on line 34, the clock on line 20, and the output of ALU 12 on line 11.

Figure 2:
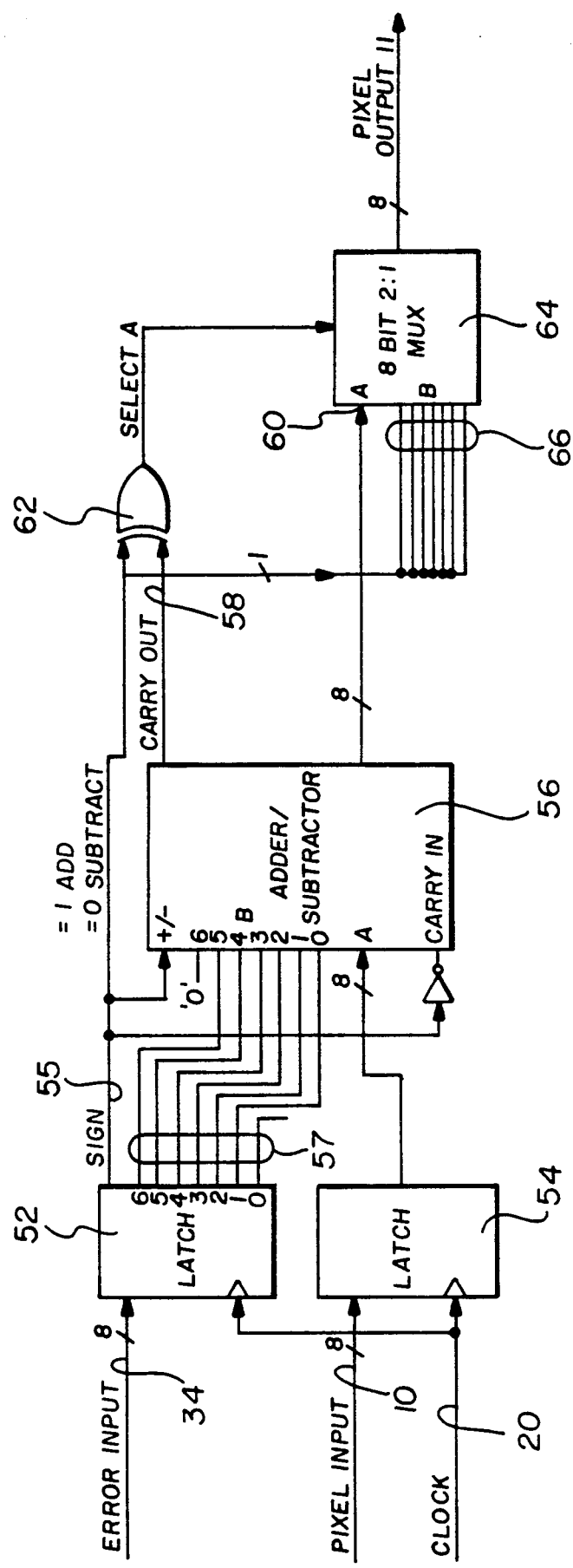
FIG. 2 shows a block diagram of an arithmetic logic unit shown in FIG. 1.

FIG. 2 illustrates in block diagram form the implementation of ALU 12 as shown in FIG. 1. There are three inputs to the ALU. An 8 bit error signal on line 34, having a sign bit with the remaining seven bits being used to indicate its level. The second input on line 10 is the pixel input which is an 8 bit unsigned signal. On the leading edge of the clock signal, both the error and pixel data entering on line 34 and 10 respectively are stored in respective latches 52 and 54. The error signal is an 8 bit signal and has a single bit indicating whether it is positive or negative with the remaining seven bits indicating the level. This error signal is generated by the error subtractor circuit 34 of FIG. 1. Between error signal latch 52 and adder/subtractor circuit 56, the error signal can be modified by powers of 2 by hardwiring a logical shift operation into the circuit. For example, by passing the six most significant bits on line 57 to the six least significant input bits to adder/subtractor 56, and setting the most significant input bit to a logical zero A divide by Z operation can be accomplished. This method can be used to define error weighting such as ½, ¼, 1/16, etc. The pixel data is an unsigned 8 bit signal indicating the level of that particular pixel.

The error signal and the pixel data are then fed to an adder subtracter circuit 56 which takes the two signals and either adds or subtracts them based on the sign of the error signal on line 55. By comparing the carry out signal on line 58 of adder subtracter circuit 56 with the sign of the error signal on line 55, a determination can be made as to whether or not the unsigned 8 bit result on line 60 is within the 0–255 range. In the case of addition, the carry in bit is set to zero, and a carry out bit equal to one indicates that the result exceeds 255. A complementary set of levels for subtraction will indicate a result less than zero. For example, if addition is performed and the result exceeds 255, the signal must be reduced or clipped to 255. If on the other hand, a subtraction were performed, and the signal is less than zero, it must be clipped to zero. An exclusive-OR gate 62 is used to make this determination, and is used to control the output of an 8 bit 2:1 multiplexer 64.

For example, when an addition operation is performed by the adder 56 and the result is within the range, the sign bit is a 1, and the carry out bit is a zero. Thus, the output of the exclusive OR gate 62 is a 1, resulting in the selection of input A 60 as a result of the calculation. On the other hand, if an addition operation result is out of the range, the sign bit remains one, and the carry out bit is also a one, this results in 2:1 multiplexer 64 selecting input B 66 which is connected to the sign bit on line 55. In this case, the sign bit is a one and therefore, the output of multiplexer 64 will be an 8 bit unsigned number with all the bits set to 1's resulting in a pixel value equal to 255. In a like manner, this circuit will also clip subtraction results to zero when the calculated value is less than zero.

Figure 3:
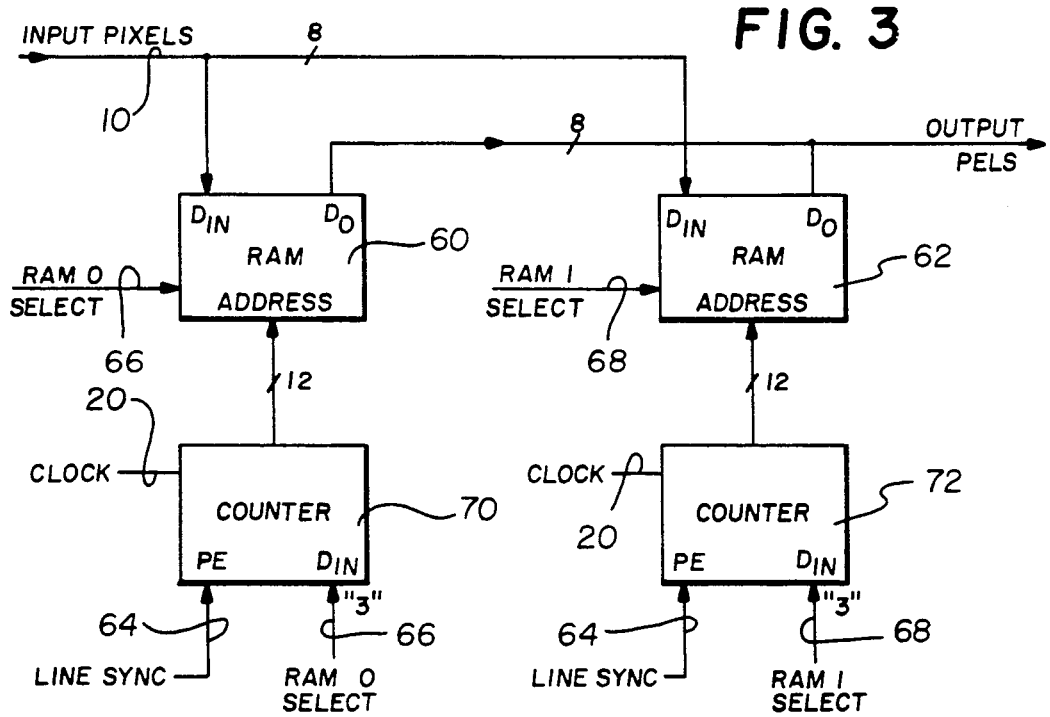
FIG. 3 shows in greater detail the line delay circuit illustrated in FIG. 1.

FIG. 3 illustrates the line delay circuitry of FIG. 1 in greater detail. Two static random access memories (RAM) 70 and 72 are used. The size of these memories is determined by the maximum line size to be processed by the circuit. In this instance, 12 address bits are used for a maximum line size of 4096 pixels. For every other image line RAM 70 receives data while RAM 72 outputs data previously written into it. This order is reversed for the intermediate lines. A one bit counter that is clocked by a line sync signal on line 48 is used to generate the RAM 0 and RAM 1 select signals on lines 76 and 78 respectively, which are complementary.

Identical 12 bit counters 80 and 82 are used to generate address data for the RAM 70 and RAM 72, respectively. Each counter 80 and 82 is clocked by the clock line 20. An input line sync signal on line 48 is used to preload counters 80 and 82 with a number at the beginning of each scan line. The purpose of this preloaded data is to make this circuit delay the pixel input by the number of pixels in a scan line less three. This is required to synchronize the pixel data in the ALU's before and after line delay 18. When scan line data is written to RAM 70, counter 80 is preloaded with zero, and when scan line data is read from RAM 72, counter 82 is preloaded with the value "3". This results in data being read three pixels later than when the data was written into line delay 18. The value 3 can be preloaded by connecting the two lowest bits of the data input line of counter 80 to the RAM 0 select line 76, and connecting all other data inputs to a zero.

Figure 4:
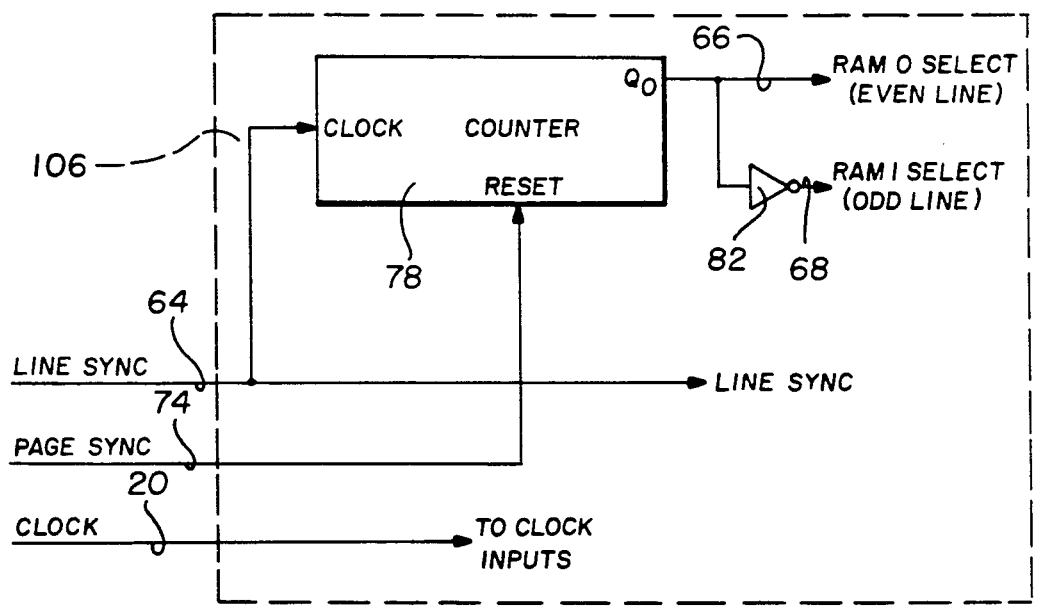
FIG. 4 shows in greater detail the circuitry for generating select signals shown in FIG. 3.

FIG. 4 illustrates the control logic 44 used to generate the RAM 0 and RAM 1 select signals used in FIG. 3. This circuit uses the line sync signal on line 48 and page sync signal on line 50 to generate the complementary output signals for RAM 0 select (even line) and RAM 1 select (odd line) on lines 76 and 78 respectively. The clock signal appears on line 20 and is used to clock all inputs. The circuit uses a one bit line counter 90 which generates complementary even line and odd line signals which are used to select the two RAM's 70 and 72 in line delay circuit 18 of FIG. 3. Counter 90 counts the line number of each scan line. As a result, the least significant bit of this counter toggles at the beginning of each successively occurring scan line. The output of this counter bit Q0 on line 76 is applied as the RAM 0 (even line) select signal and through inverter 94, as the RAM 1 (odd line) select signal. This counter is reset at the beginning of each incoming image by the page sync signal appearing on input lead 50. The line sync signal appearing on input lead 48 provides the pre-set enable signal at the beginning of each scan line.

Figure 5:
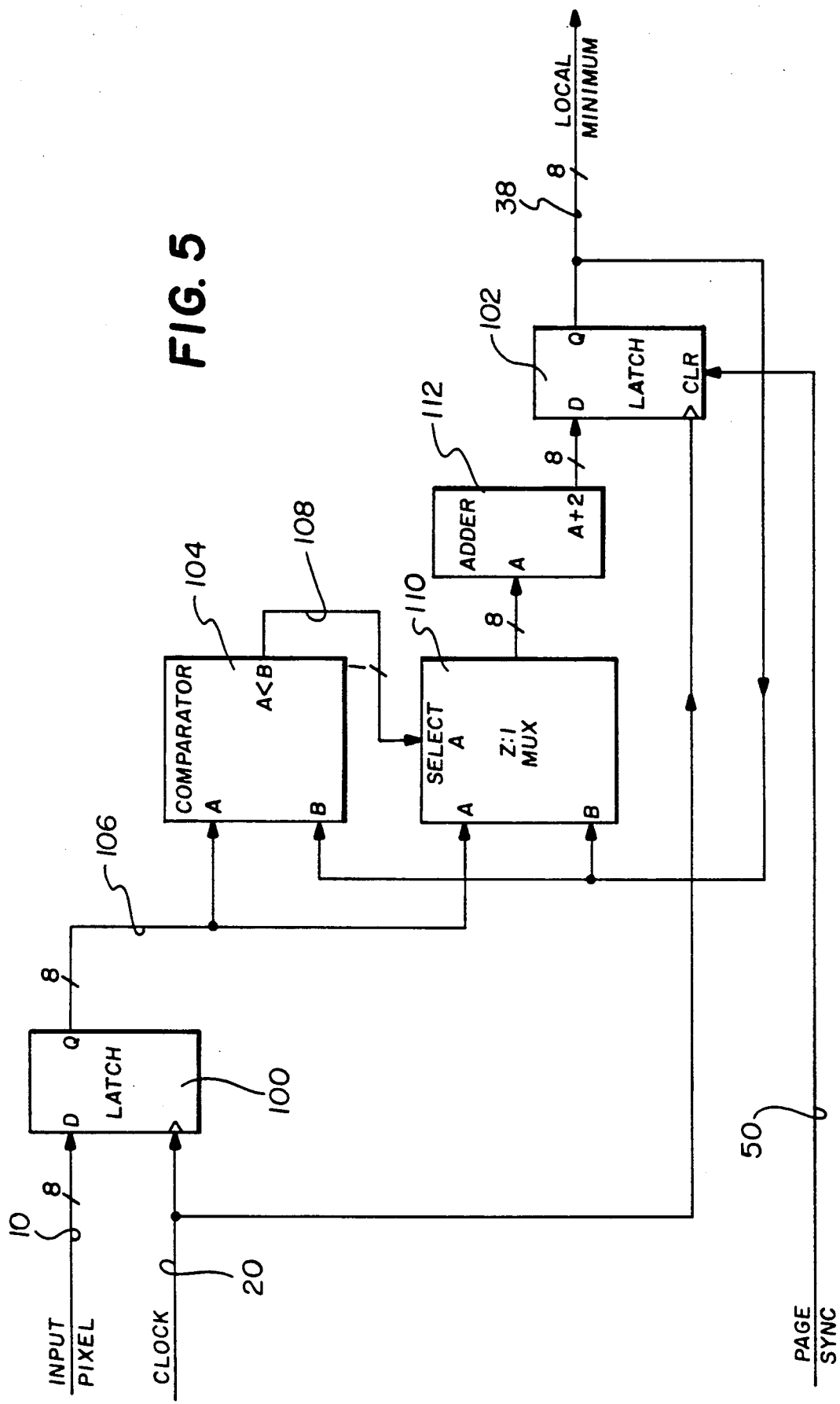
FIG. 5 shows in greater detail the local minimum detector circuit illustrated in FIG. 1.

FIG. 5 illustrates the local minimum detector circuit 42 shown in FIG. 1. Input pixel data on line 10 is stored in latch 100. Latch 102 stores the current minimum value. The page sync signal on line 50 serves to reset latch 102 to zero at the beginning of a new image. The local minimum circuit will then adapt to the image data from this initial condition, preventing previous image data from affecting the results. The output of input pixel latch 100 is routed to comparator 104 and 2:1 multiplexer 110 via line 106. Comparator 104 determines the smaller of the signals on line 106 or the local minimum on line 38. This determination is passed to 2:1 multiplexer 110 via line 108. In the event that the signal on line 106 is less than the local minimum, 2:1 multiplexer 110 will select the signal on line 106 to be the new local minimum. Otherwise the old local minimum will be passed thru the multiplexer to the adder 112. Adder 112 will add 2 digital counts to the minimum and pass the result to the local minimum latch 102. Adding these counts prevents the minimum from staying equal to zero. The actual counts to be added can be determined empirically, or even be made programmable via an external host computer. The output of latch 102 is the local minimum signal and is routed to the error subtractor circuit 32 in FIG. 1 via line 38.

Figure 6:
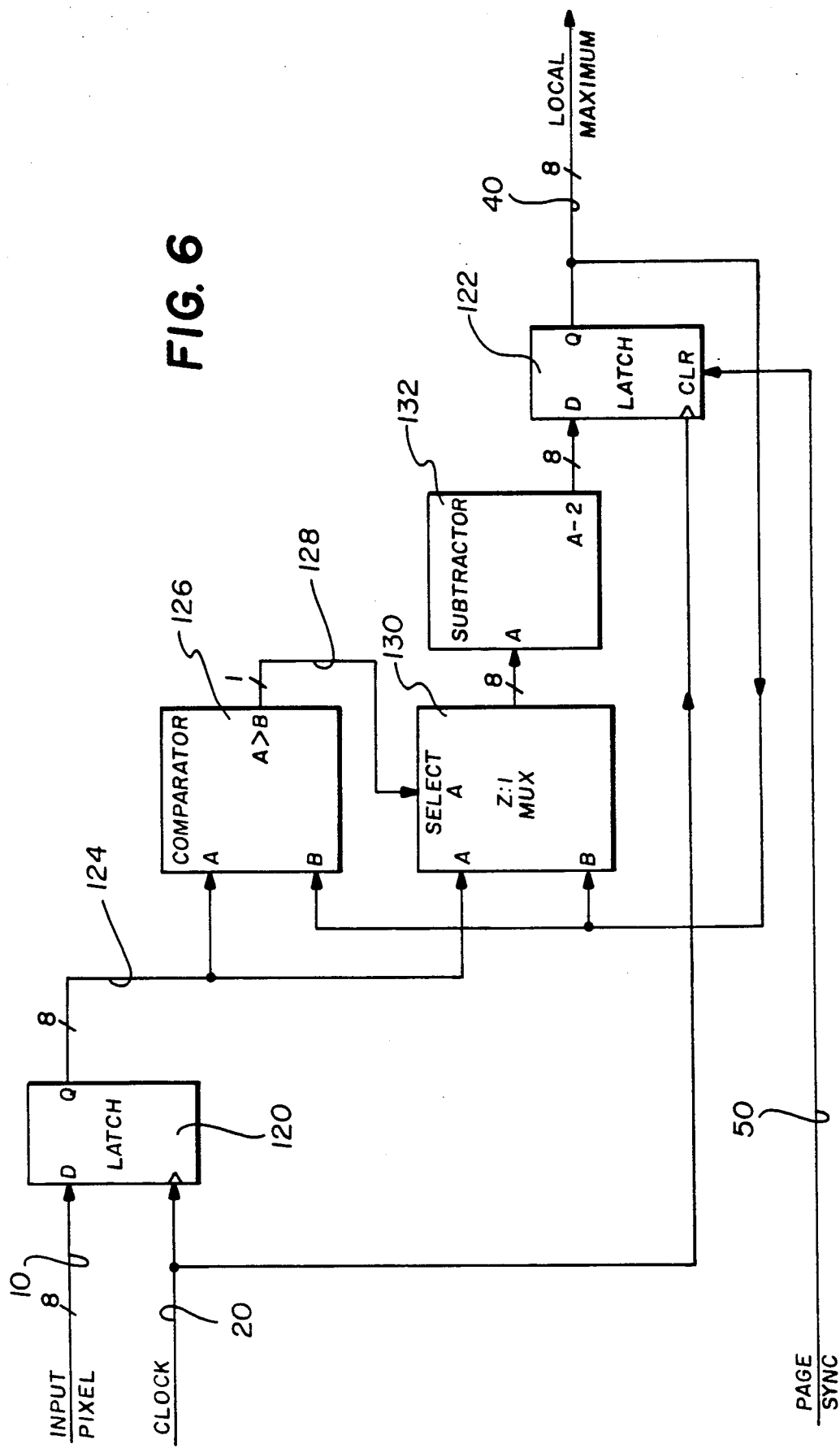
FIG. 6 shows in greater detail the local maximum detector circuit illustrated in FIG. 1.

FIG. 6 illustrates the local maximum detector circuit 45. Input pixel data on line 10 is stored in latch 120. Latch 122 stores the current maximum value. The page sync signal on line 50 serves to preset latch 122 to a level of 255 at the beginning of a new image. The output of input pixel latch 120 is routed to comparator 126 and 2:1 multiplexer 130 via line 124. Comparator 126 determines the larger of the signals on line 124 or the local maximum on line 40. This determination is passed to 2:1 multiplexer 130 via line 128. In the event that the signal on line 128 is greater than the local maximum, 2:1 multiplexer 130 will select the signal on line 124 to be the new local maximum. Otherwise the old local maximum will be passed thru the multiplexer to the subtractor 132. Subtractor 132 will remove 2 digital counts to the maximum and pass the result to the local maximum latch 122. Subtracting these counts prevents the maximum from staying equal to 255. As mentioned before, the actual counts to be added can be determined empirically, or even be made programmable via an external host computer. The output of latch 122 is the local maximum signal and is routed to the error subtractor circuit 32 in FIG. 1 via line 40.

Figure 7:
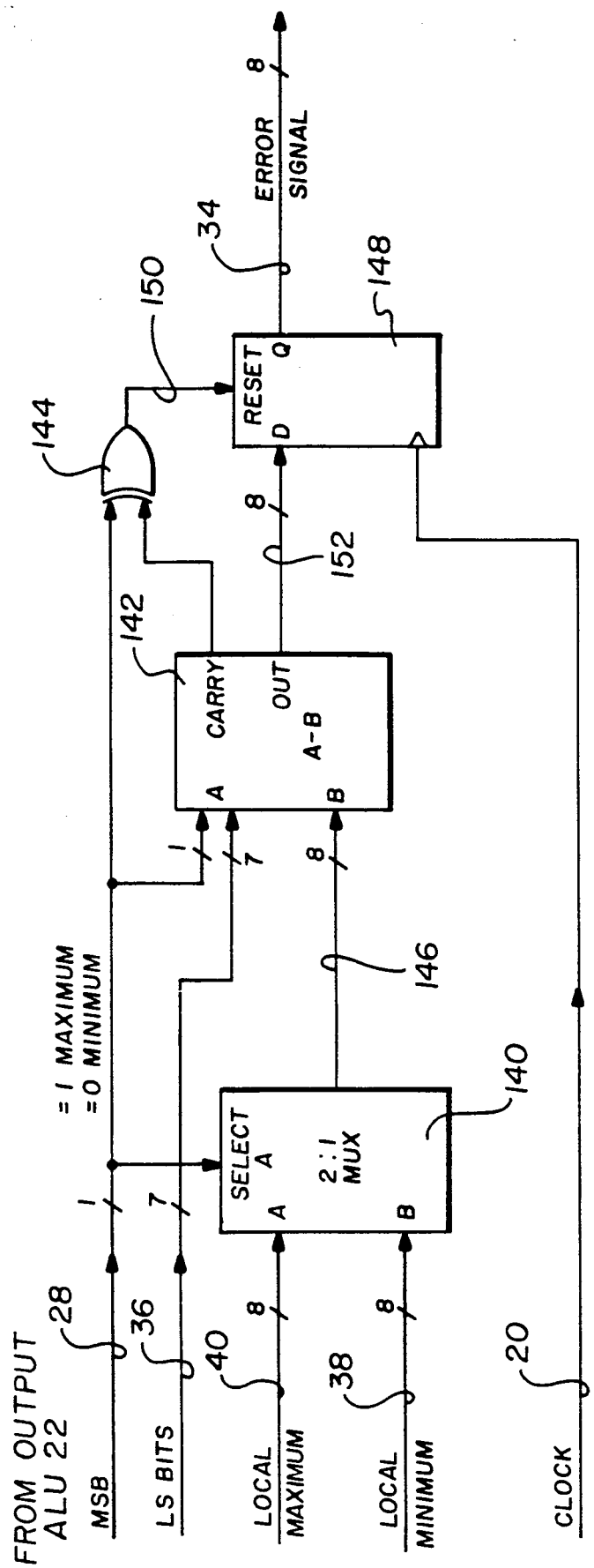
FIG. 7 shows in greater detail the error subtractor circuit illustrated in FIG. 1.

Generation of the error signal is illustrated in FIG. 7 containing 2:1 multiplexer 140, subtractor circuit 142, exclusive OR gate 144, and resettable latch 148. The lower 7 bits of ALU 22 output is input to subtractor circuit 142 on line 36, while the most significant bit of this ALU output is input to subtractor circuit 142 on line 28. The local minimum signal is input to 2:1 multiplexer on line 38, while the local maximum is delivered on line 40. Both lines 38 and 40 are 8 bits wide. When the most significant bit on line 28 is high the local maximum signal is selected by 2:1 multiplexer 140 and passed to subtractor circuit 142 via line 146. When the signal on line 28 is low the minimum is selected instead.

Subtractor circuit 142 operates by subtracting the signal on line 146 from the signals on lines 28 and 36 which are combined into a single 8 bit input A. The carry signal from subtractor 142 is input to exclusive OR gate 144, as is the most significant bit from ALU 22 on line 28. Exclusive OR gate 144 serves to determine when the calculated error signal is out of range. For example if the local maximum is selected and is equal to 200 while the output of ALU 22 is equal to 220 an out of range error of 20 would be calculated. In this case the signal on line 28 is equal to a logical 1, while the carry output of subtracter 142 is equal to a logical zero. Exclusive OR gate 144 produces a logical 1 one on line 150 in this case. A logical 1 input to resettable latch 148 on line 150 will force the output of the latch to an eight bit zero value which is the desired error result in this example.

For normal in range error calculations the output of subtractor circuit 142 is passed to resettable latch 148 via line 152. The clock signal on line 20 latches this data which is then passed to ALUs 12, 14, 16, and 22 via line 34.

ADVANTAGES AND INDUSTRIAL APPLICABILITY

Use of the present invention offers advantages in the area of digital enhancement where bilevel devices are used to output computer generated graphics, for example. One field of applicability would be in the scanning and conversion of document or microfilm images into bilevel images to be stored in digital form.

What is claimed is:

1. Apparatus for performing error diffusion thresholding of multiple level digital images into bi-level digital images using either a local minimum or local maximum signal to calculate the error signal, said apparatus comprising:

means for scanning a grayscale image and detecting the density levels of individual input pixels;

means for delaying said input pixels by a predetermined number of pixel locations per line and by a predetermined number of scan lines;

means for generating a fixed threshold signal;

means for comparing said threshold signal to one of said delayed pixels to generate a bi-level output pixel value;

means for generating a signal representing the local minimum signal level of said input pixels;

means for generating a signal representing the local maximum signal level of said input pixels;

means for selecting either the said local minimum or said local maximum based on said output pixel;

means for generating an error signal using said selected minimum or maximum signal and the said delayed pixel used in said thresholding comparison, such that said error signal contains either positive or negative sign information;

means for weighting said error signal by a fixed number of predetermined factors;

means for adding or subtracting said weighted error signal from said fixed number of remaining delayed pixel values thus generating new delayed pixel values; and means for checking to insure that said new delayed pixel values are within a predetermined range.

2. The apparatus in claim 1 wherein said local maximum signal is generated by a peak detector.

3. The apparatus in claim 1 wherein said local minimum signal is generated by a valley detector.

4. The apparatus in claim 1 wherein said selection of local minimum or maximum values is a two to one multiplexer controlled by the bi-level output pixel.

5. The apparatus in claim 1 wherein said delaying means further comprises:

a line delaying means and a pixel delaying means.

6. Apparatus for performing error diffusion thresholding of multiple level digital images into digital images with fewer levels using either a local minimum or local maximum signal to calculate the error signal, said apparatus comprising:

means for scanning a grayscale image and detecting the density levels of individual input pixels;

means for delaying said input pixels by a predetermined number of pixel locations per line and by a predetermined number of scan lines;

means for generating an output pixel value using one of said delayed pixels;

means for generating a signal representing the local minimum signal level of said input pixels;

means for generating a signal representing the local maximum signal level of said input pixels;

means for selecting either the said local minimum or said local maximum based on said output pixel;

means for generating an error signal using said selected minimum or maximum signal and the said delayed pixel used in said thresholding comparison, such that said error signal may contain either positive or negative signal information;

means for weighting said error signal using a fixed number of predetermined factors;

means for adding or subtracting said weighted error signal from said fixed number of remaining delayed pixel values thus generating new delayed pixel values; and means for checking to insure that said new delayed pixel values are within a predetermined range.

7. The apparatus in claim 6 wherein said local maximum signal is generated by a peak detector.

8. The apparatus in claim 6 wherein said local minimum signal is generated by a valley detector.

9. The apparatus in claim 6 wherein said output value generation means is comprised of a random access memory that is loaded with a predefined output function via external means.

10. The apparatus in claim 6 wherein said output value generation means is comprised of a programmable read only memory which contains a predefined output function.

11. The apparatus in claim 6 wherein said selection of local minimum or maximum values is a two to one multiplexer controlled by the most significant bit of the output pixel.

12. The apparatus in claim 6 wherein said delaying means further comprises:

a line delaying means and a pixel delaying means.

* * * * *